US008145391B2

(12) United States Patent
Omelchenko et al.

(10) Patent No.: US 8,145,391 B2
(45) Date of Patent: Mar. 27, 2012

(54) AUTOMATIC BLADE CONTROL SYSTEM WITH INTEGRATED GLOBAL NAVIGATION SATELLITE SYSTEM AND INERTIAL SENSORS

(75) Inventors: Alexander Omelchenko, Moscow (RU); Alexey Vladislavovich Zhdanov, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 531 days.

(21) Appl. No.: 12/207,038

(22) Filed: Sep. 9, 2008

(65) Prior Publication Data

US 2009/0069987 A1 Mar. 12, 2009

(51) Int. Cl.
*G06F 19/00* (2011.01)
*G01S 19/14* (2010.01)
*E02F 3/815* (2006.01)
(52) U.S. Cl. .................. 701/50; 342/357.52; 172/4.5
(58) Field of Classification Search ............ 701/1, 36, 701/50, 213, 215, 216; 342/357.3, 357.52; 172/4.5
See application file for complete search history.

(56) References Cited

U.S. PATENT DOCUMENTS

| | | | |
|---|---|---|---|
| 3,974,699 A | | 8/1976 | Morris et al. |
| 5,951,613 A | | 9/1999 | Sahm et al. |
| 6,068,060 A | * | 5/2000 | Ohtomo et al. ............... 172/4.5 |
| 6,112,145 A | | 8/2000 | Zachman |
| 6,450,267 B2 | * | 9/2002 | Ohtomo et al. ............... 172/4.5 |
| 6,480,152 B2 | * | 11/2002 | Lin et al. ................. 342/357.32 |
| 6,655,465 B2 | * | 12/2003 | Carlson et al. ............... 172/4.5 |
| 7,317,977 B2 | | 1/2008 | Matrosov |
| 7,588,088 B2 | * | 9/2009 | Zachman ....................... 172/4.5 |
| 7,764,365 B2 | * | 7/2010 | Nichols et al. .......... 356/139.01 |
| 2002/0162668 A1 | | 11/2002 | Carlson et al. |
| 2006/0279727 A1 | * | 12/2006 | Nichols et al. .......... 356/139.01 |
| 2008/0000659 A1 | * | 1/2008 | Zachman ..................... 172/797 |

FOREIGN PATENT DOCUMENTS

| | | |
|---|---|---|
| EP | 0 763 749 | 3/1997 |
| EP | 0 997 579 | 5/2000 |

OTHER PUBLICATIONS

International Search Report corresponding to PCT Application No. PCT/US2008/010570 filed Sep. 10, 2008 (6 pages).
Written Opinion of the International Searching Authority corresponding to PCT Application No. PCT/US2008/010570 filed Sep. 10, 2008 (9 pages).

* cited by examiner

*Primary Examiner* — Bret Hayes
(74) *Attorney, Agent, or Firm* — Wolff & Samson PC

(57) ABSTRACT

Disclosed are method and apparatus for controlling the blade elevation and blade slope angle of a dozer blade. Elevation and slope angle measurements are calculated from measurements received from a global navigation satellite system (GNSS) antenna and an inertial measurement unit mounted on the dozer blade. The inertial measurement unit includes three orthogonally placed accelerometers and three orthogonally placed rate gyros. The measurements are processed by algorithms to calculate estimates of the blade elevation, blade vertical velocity, blade slope angle, and blade slope angular velocity. These estimates are then provided as inputs to a control algorithm which provides control signals to control a dozer hydraulic system which controls the blade elevation and blade slope angle.

16 Claims, 12 Drawing Sheets

AUTOMATIC BLADE CONTROL SYSTEM WITH INTEGRATED GLOBAL NAVIGATION SATELLITE SYSTEM AND INERTIAL SENSORS

This application claims the benefit of U.S. Provisional Application No. 60/993,713 filed Sep. 12, 2007, which is incorporated herein by reference.

BACKGROUND OF THE INVENTION

The present invention relates generally to earth-grading machines, and more particularly to an automatic blade control system for dozers.

Global Navigation Satellite System (GNSS) sensors have been extensively used in the area of construction machine control, particularly in grading applications. Although a control system using only a GNSS sensor for positioning may result in appropriate grading quality in some types of machines, such as graders and scrapers, it has certain limitations in other types of machines, such as dozers. A combination of a GNSS sensor with a proportional controller, commonly found in dozer blade control systems, often results in specific wave-like patterns on the ground after grading, particularly at high dozer speeds. What are needed are method and apparatus for more precise control of grading operations by a dozer.

BRIEF SUMMARY OF THE INVENTION

In an embodiment, the blade elevation and blade slope angle of a dozer blade are controlled based at least in part on measurements received from at least one global navigation satellite system (GNSS) sensor and at least one inertial sensor mounted on the dozer blade. In an embodiment, one or two antennas receiving GNSS signals are mounted on a pole fixed to the dozer blade. An inertial measurement unit is also mounted on the dozer blade. The inertial measurement unit includes three orthogonally placed accelerometers and three orthogonally placed rate gyros. Estimates of the blade elevation, blade vertical velocity, blade slope angle, and blade slope angular velocity are calculated. These estimates are provided as inputs to calculations resulting in control signals to a dozer hydraulic system which controls the blade elevation and blade slope angle. Tangential and centripetal accelerations arising from circular motions of the dozer are compensated for.

These and other advantages of the invention will be apparent to those of ordinary skill in the art by reference to the following detailed description and the accompanying drawings.

DETAILED DESCRIPTION

Figure 1A:
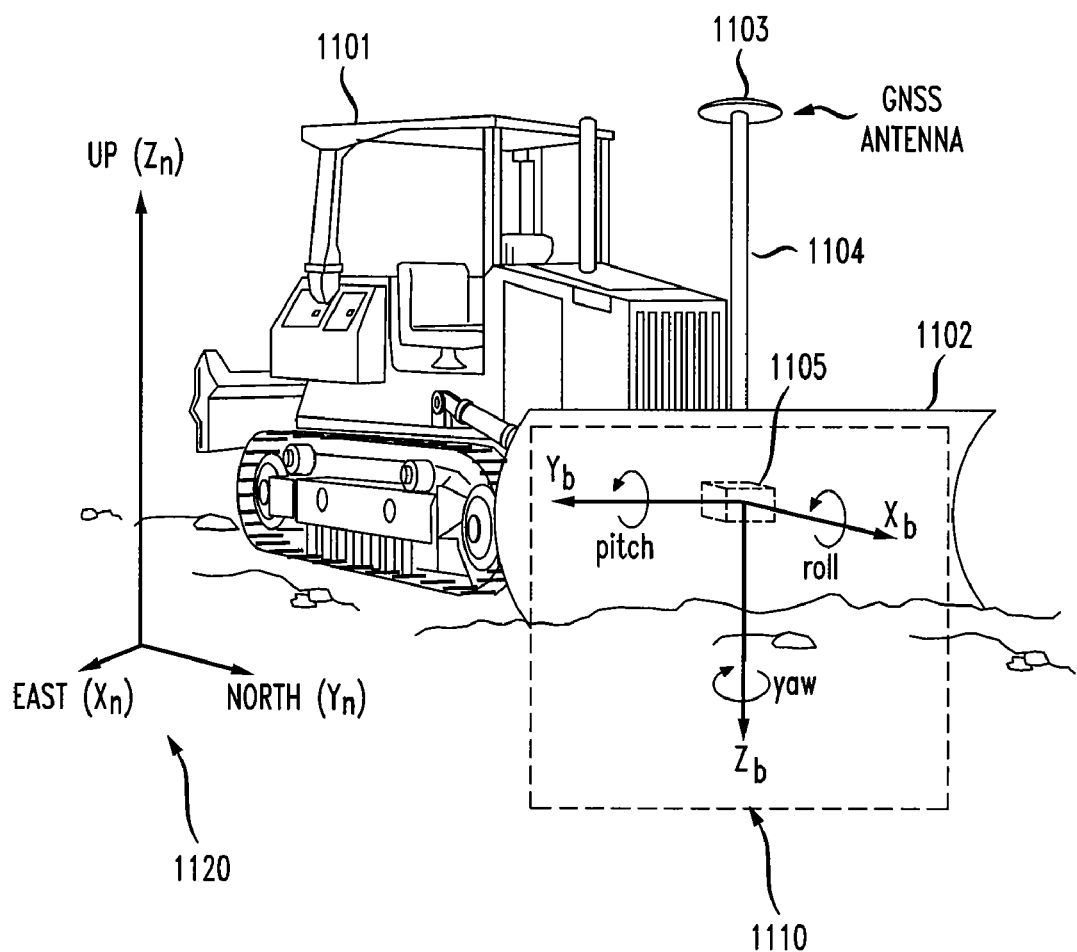
FIG. 1(a) shows schematics of the dozer geometry, navigation reference frame, and blade reference frame.

FIG. 1(a)-FIG. 1(d) illustrate the dozer configuration and reference frames used in the discussions below. In FIG. 1(a), dozer body 1101 is equipped with dozer blade 1102. The front side of dozer blade 1102 faces away from dozer body 1101. Global Navigation Satellite System (GNSS) antenna 1103 is mounted on pole 1104, which is fixed to dozer blade 1102. In an embodiment, a second GNSS antenna may be mounted on a pole fixed to dozer blade 1102. Inertial measurement unit IMU 1105 is installed on the rear side of dozer blade 1102 (facing towards dozer body 1101). A GNSS receiver (not shown) may be installed in the cabin of dozer body 1101. A control box (not shown) may also be installed in the cabin of dozer body 1101. Further details of the control box are discussed below.

In FIG. 1(a), the navigation frame 1120 is a Cartesian coordinate system used as a local navigation frame. The axes of the navigation frame 1120 are denoted ENU [East ($X_n$), North ($Y_n$), Up ($Z_n$)]. The $X_n$-$Y_n$ plane is tangent to the World Geodetic System 1984 (WGS-84) Earth ellipsoid.

In FIG. 1(a), the blade frame 1110 is a Cartesian coordinate system referenced with respect to dozer blade 1102. The orientations of the blade frame axes ($X_b$, $Y_b$, $Z_b$) are fixed with respect to dozer blade 1102. The origin is set at a user-defined reference point in IMU 1105. Orientation angles in blade frame 1110 are referenced with respect to rotation about the ($X_b$, $Y_b$, $Z_b$) axes. Rotation in the positive direction about the ($X_b$, $Y_b$, $Z_b$) axes are referred to as (blade roll, blade pitch, blade yaw), respectively. Herein, blade roll angle is also referred to as blade slope angle. A system configuration with a single GNSS antenna, as shown in FIG. 1(a), may be used in an embodiment in which the blade angle with respect to the dozer body 1101 is constant at zero degrees. For an embodiment in which the blade angle with respect to the dozer body 1101 is a variable, non-zero, angle, a two-antenna configuration may be used.

Figure 1B:
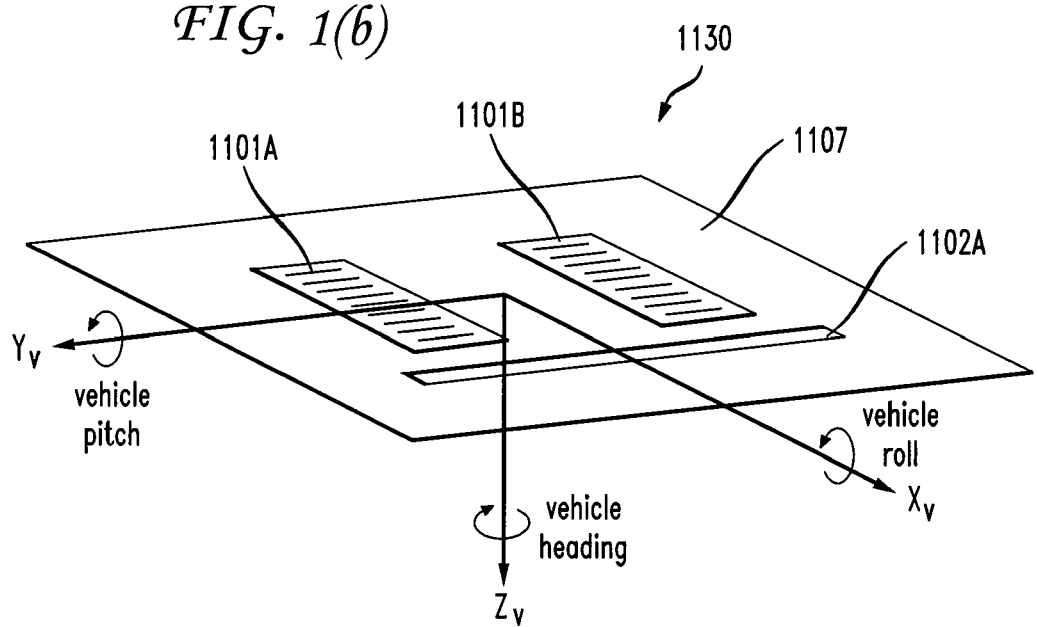
FIG. 1(b) shows a schematic of the vehicle reference frame.

In FIG. 1(b), the vehicle frame 1130 is a Cartesian coordinate system with axes ($X_v$, $Y_v$, $Z_v$) fixed relative to dozer body 1101. The origin is a user-defined reference point on the ground plane 1107. Footprint 1101A and footprint 1101B represent the dozer tracks. Footprint 1102A represents the projection of the bottom edge of dozer blade 1102. As shown in FIG. 1(b), orientation angles in vehicle frame 1130 are referenced with respect to rotation about the ($X_v$, $Y_v$, $Z_v$) axes. Rotation in the positive direction about the ($X_v$, $Y_v$, $Z_v$) axes are referred to as (vehicle roll, vehicle pitch, vehicle heading), respectively.

Another reference frame used in the algorithms below, but not shown explicitly in the figures, is the Earth-Centered, Earth-Fixed (ECEF) frame. This is well known in the art for navigation systems deploying GNSS.

In an embodiment, a set of sensors are used for blade control. A GNSS receiver receives signals from GNSS antenna 1103. As discussed above, two GNSS antennas may be used in an embodiment. Herein, GNSS antennas are also referred to as GNSS sensors. The inertial measurement unit IMU 1105 includes three orthogonally-placed rate gyros and three orthogonally-placed accelerometers. Herein, rate gyros and accelerometers are also referred to as inertial sensors. In an embodiment, IMU 1105 may include additional sensors. Herein, a rate gyro refers to a sensor which measures angular velocity about an axis. Data from the GNSS receiver in combination with data from IMU 1105 may be processed to calculate blade elevation and blade vertical velocity. Data from IMU 1105 may be processed to calculate blade roll angle and blade roll angular velocity (herein, blade roll angular velocity is also referred to as blade slope angular velocity). The accelerometers measure the acceleration vector components of the acceleration along each of the axes ($X_b$, $Y_b$, $Z_b$) in the blade frame 1110. The gyroscopes measure the angular velocity vector components along each of the axes ($X_b$, $Y_b$, $Z_b$).

Data from the GNSS receiver and data from IMU 1105 may be processed by estimation and control algorithms executed in a control box, details of which are discussed below. The output of the algorithms may be provided as input to a drive system (not shown), which controls the blade elevation and blade slope angle of dozer blade 1102. An example of a drive system is a hydraulic system connected to dozer blade 1102.

To achieve proper fusion of the data from the GNSS receiver and from the sensors in IMU 1105, conversion of data to the appropriate reference frames are needed. In the algorithms below, the superscript GNSS denotes values obtained from the GNSS receiver, and the superscript IMU denotes values obtained from IMU 1105. As discussed above, the subscripts on the position and orientation variables refer to the following reference frames:
  b refers to the blade frame 1110
  v refers to the vehicle frame 1130
  n refers to the navigation frame 1120
  ECEF refers to the Earth-Centered, Earth-Fixed frame (not shown).
Conversion from one reference frame to another reference frame is specified by rotation matrices. For example, $R_{b2v}$ denotes the rotation matrix from blade frame 1110 to vehicle frame 1130, and $R_{v2b}$ denotes the rotation matrix from vehicle frame 1130 to blade frame 1110.

Figure 1C:
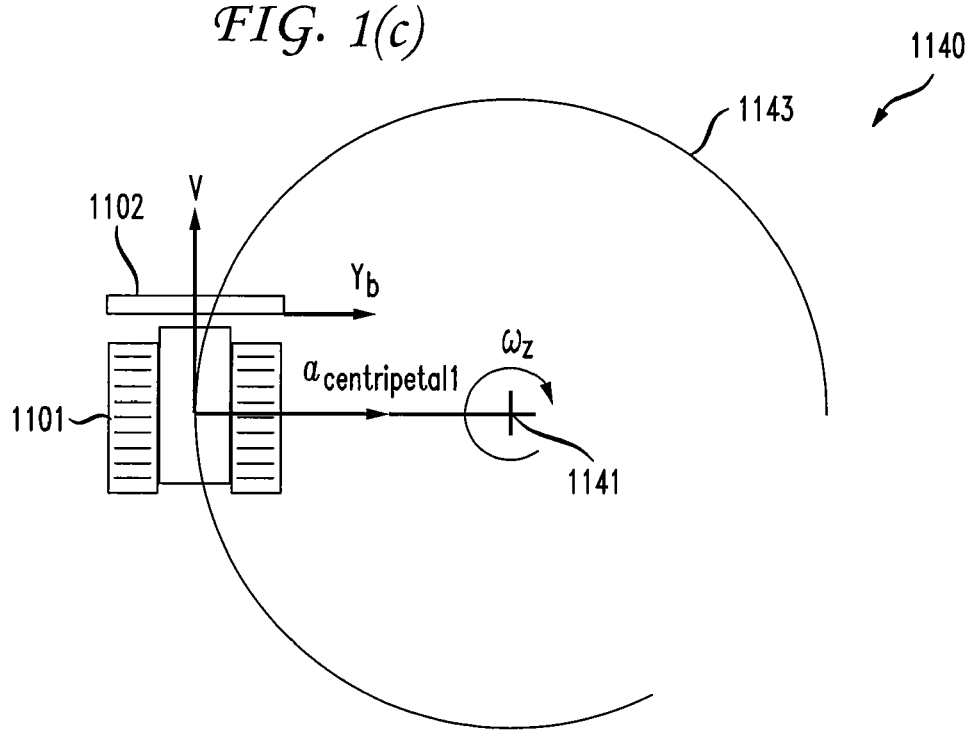
FIG. 1(c) illustrates a scenario which results in a centripetal acceleration.
Figure 1D:
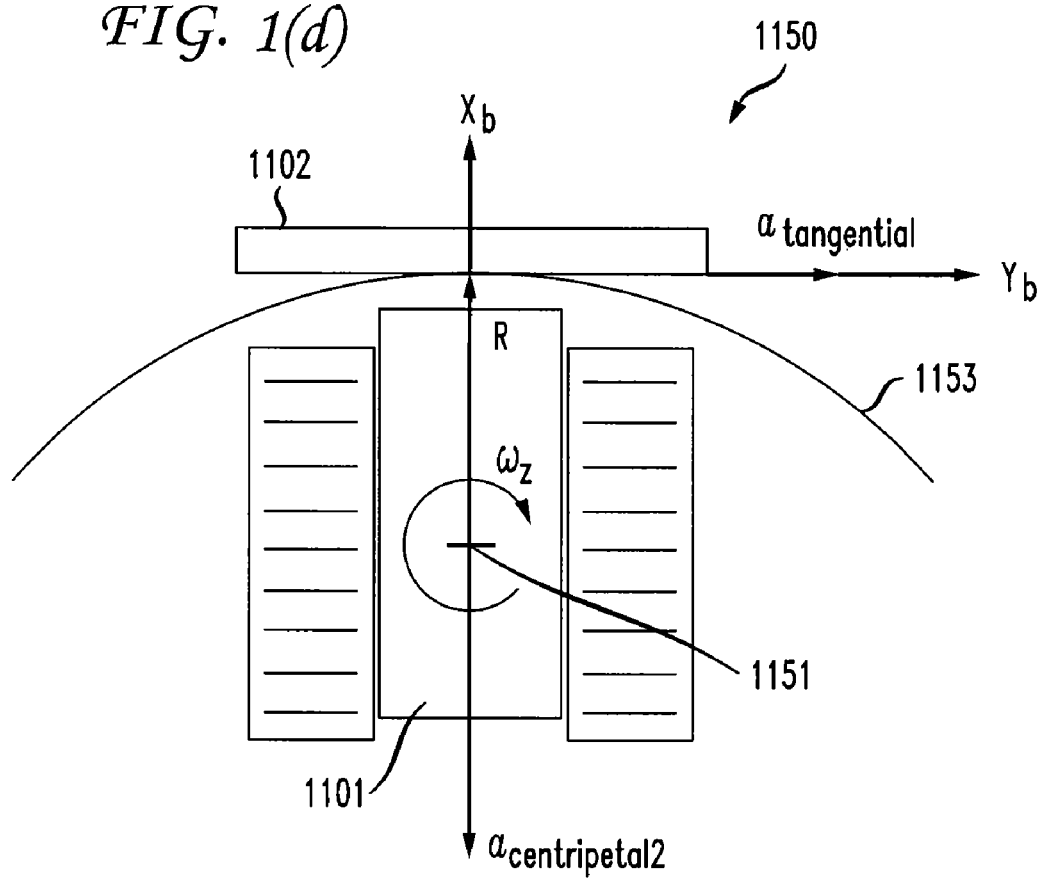
FIG. 1(d) illustrates a scenario which results in a centripetal acceleration and a tangential acceleration.

FIG. 1(c) and FIG. 1(d) illustrate two common types of dozer maneuvers during which centripetal and tangential accelerations may arise. These accelerations may distort accelerometer measurements. In an embodiment, these additional acceleration components are estimated and subtracted from respective accelerometer measurements. In FIG. 1(c), dozer body 1101 traverses circular path 1143, centered at center 1141. Its angular velocity about the Z-axis is $\omega_z$, and its velocity vector V is tangent to the circular path 1143. In this case, a centripetal acceleration component $a_{centripetal1}$ is added to the $Y_b$-axis accelerometer measurement.

In FIG. 1(d), dozer body 1101 rotates about center point 1151. This maneuver may be used to turn the dozer and may also occur unintentionally, however. For example, unintentional rotation may result from erratic movements of the driver's hands, when the driver is steering the dozer body 1101 along a curved trajectory. During this maneuver, tangential acceleration $a_{tangential}$ is added to the $Y_b$-axis accelerometer measurement, and centripetal acceleration $a_{centripetal2}$ is added to the $X_b$-axis accelerometer measurement. In examples discussed herein, centripetal and tangential accelerations in other directions are considered to be negligible. One skilled in the art, however, may develop embodiments to handle situations in which centripetal and tangential accelerations in other directions are significant.

In an embodiment, correction for tangential and centripetal acceleration may be performed according to compensation algorithms, as schematically shown in FIG. 2(a)-FIG. 4(b). The diagrams in FIG. 2(a) and FIG. 2(b) may be merged via index points A 1202 and B 1204 to form one continuous diagram. The diagrams in FIG. 3(a) and FIG. 3(b) may be merged via index points C 1302 and D 1304 to form one continuous diagram. The diagrams in FIG. 4(a) and FIG. 4(b) may be merged via index points E 1402-K 1414 to form one continuous diagram. In the algorithms below, the following conventions are used: $\hat{f}$ is an estimate of f and $\dot{f}$ is the time derivative of f.

Figure 2A:
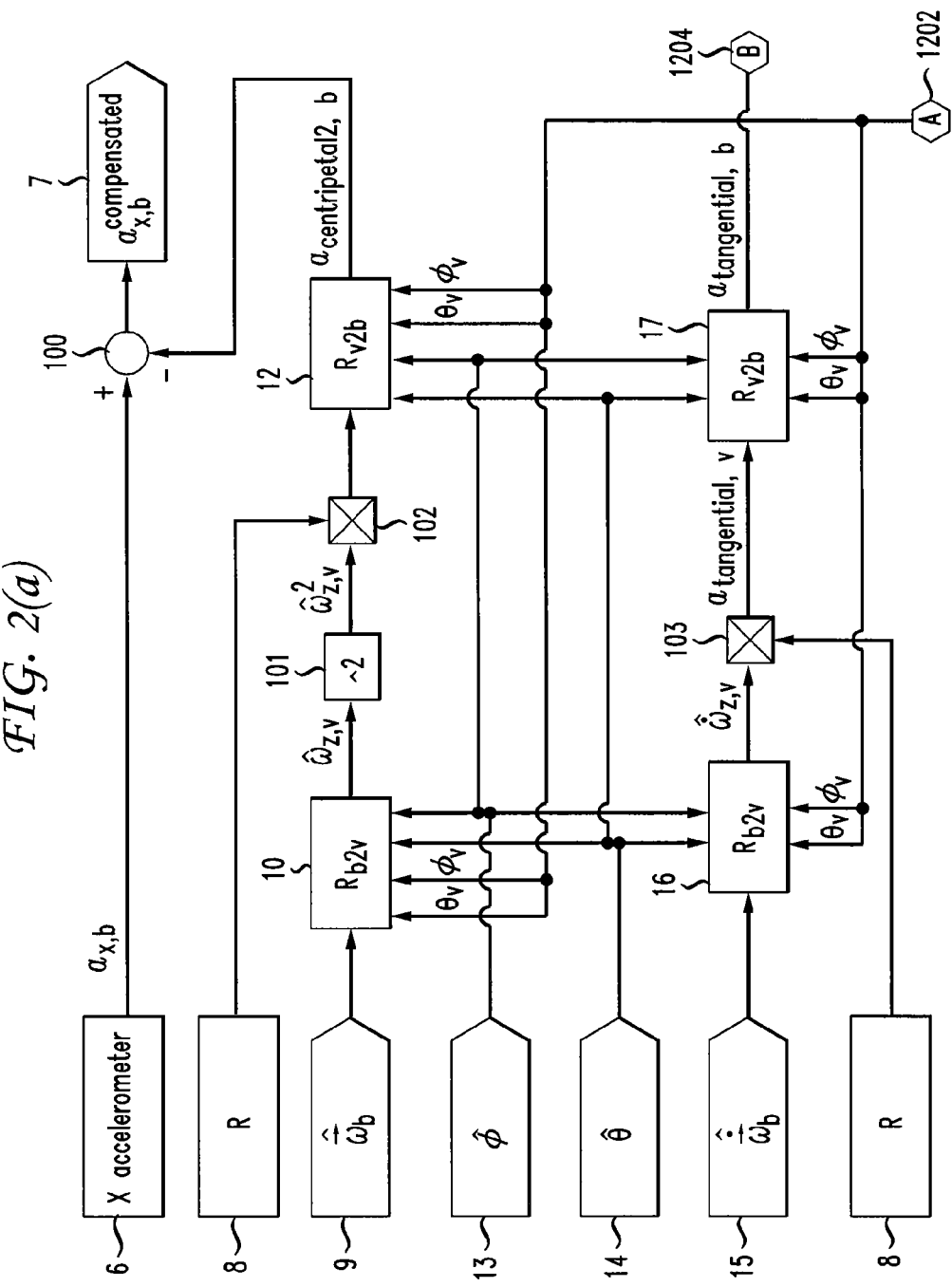
FIG. 2(a) and FIG. 2(b) show a schematic of centripetal and tangential acceleration compensation algorithms.

The correction factor for the X-axis acceleration readings is calculated as follows. Referring to FIG. 2(a), $a_{x,b}$, the acceleration measured by the X accelerometer 6, is input into summation operator 100. The centripetal acceleration $a_{centripetal2,b}$ is also input into summation operator 100, and is subtracted from $a_{x,b}$. The output of the summation operator 100 is the compensated value of the acceleration, $a_{x,b}^{compensated}$ 7 ($a_{x,b}^{compensated} = a_{x,b} - a_{centripetal2,b}$).

As shown in FIG. 1(d), $a_{centripetal2}$ is first computed in the vehicle frame 1130 as a product of the square of the Z-axis angular velocity and the radius of rotation R. It is then converted to the blade frame 1110. The radius of rotation R is calculated from the geometric parameters of dozer body 1101 and dozer blade 1102, as follows. Referring to FIG. 1(d), the radius R is calculated as the distance between center point 1151 [which may be referenced to the center of the dozer tracks 1101A and 1101B in FIG. 1(b)] and the location of IMU 1105 [FIG. 1(a)] on dozer blade 1102. The calculation sequence is represented in FIG. 2(a) as follows. The value $\hat{\omega}_{z,v}$ is an estimate of the Z-axis angular velocity in the vehicle frame 1130. Let $R_{b2v}$ 10 and $R_{v2b}$ 12 denote matrices of rotation from the blade frame 1110 to the vehicle frame 1130 and from the vehicle frame 1130 to the blade frame 1110, respectively. Details of the rotation matrices are discussed below. The input value $\vec{\omega}_b$ 9 is an estimate of the angular velocity vector measured in the blade frame 1110. It is transformed by rotation matrix $R_{b2v}$ 10, and the component $\hat{\omega}_{z,v}$ is calculated. This value is input into square operator 101. The output value $\hat{\omega}_{z,v}^2$ is input into multiplication operator 102. The radius of rotation R 8 is also input into multiplication operator 102. The output product $\hat{\omega}_{z,v}^2 R$ is then input into rotation matrix $R_{v2b}$ 12, and the component $\hat{\omega}_{z,b}^2 R = a_{centripetal2,b}$, as discussed above, is input into summation operator 100, and subtracted from $a_{x,b}$ to yield $a_{x,b}^{compensated}$ 7.

Figure 4A:
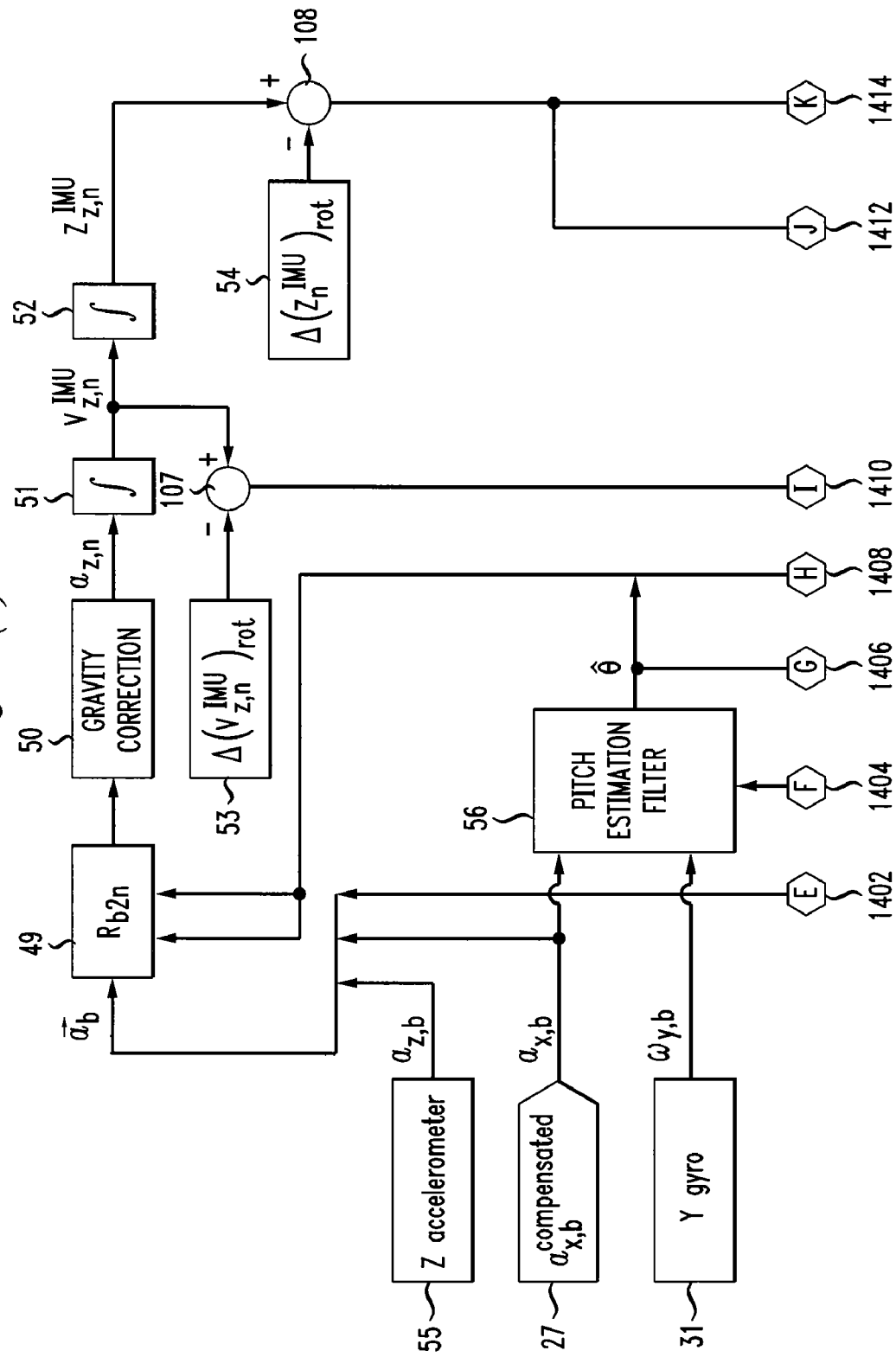
FIG. 4(a) and FIG. 4(b) show a schematic of a blade elevation and blade vertical velocity estimation algorithm.
Figure 4B:
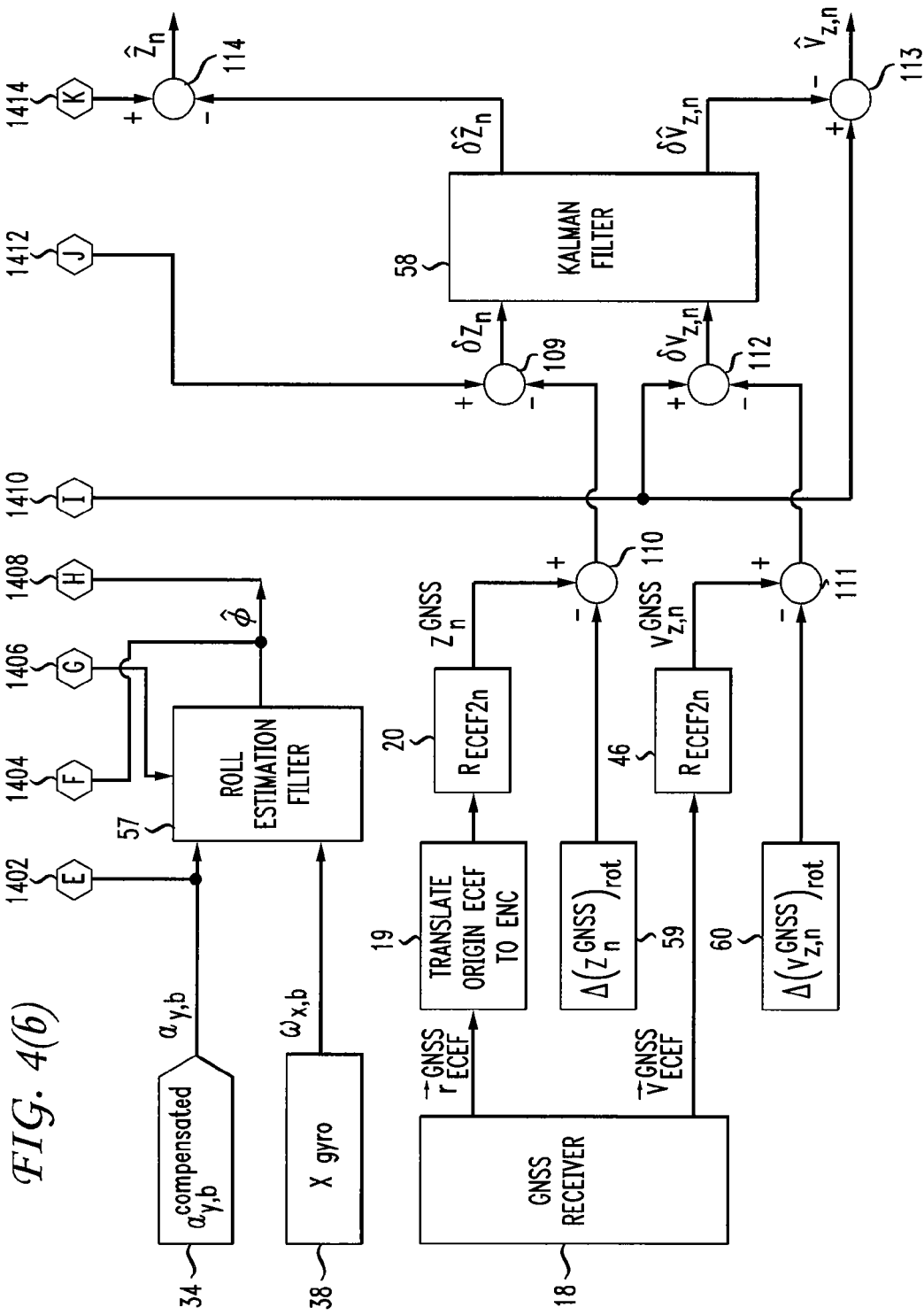

The rotation matrices $R_{b2v}$ 10 and $R_{v2b}$ 12 depend on the values of the blade pitch and blade roll angle estimates, $\hat{\theta}$ 14 and $\hat{\phi}$ 13, obtained from the pitch estimation filter 56 and roll estimation filter 57 [FIG. 4(a) and FIG. 4(b)] and depend on the values of the vehicle pitch and roll angles, $\theta_v$ and $\phi_v$, obtained from the terrain model 21. The terrain model 21 comprises a set of points, each specified by three coordinates, which map the geometry of the terrain. The digital three-dimensional terrain model 21 is updated in real time.

Figure 2B:
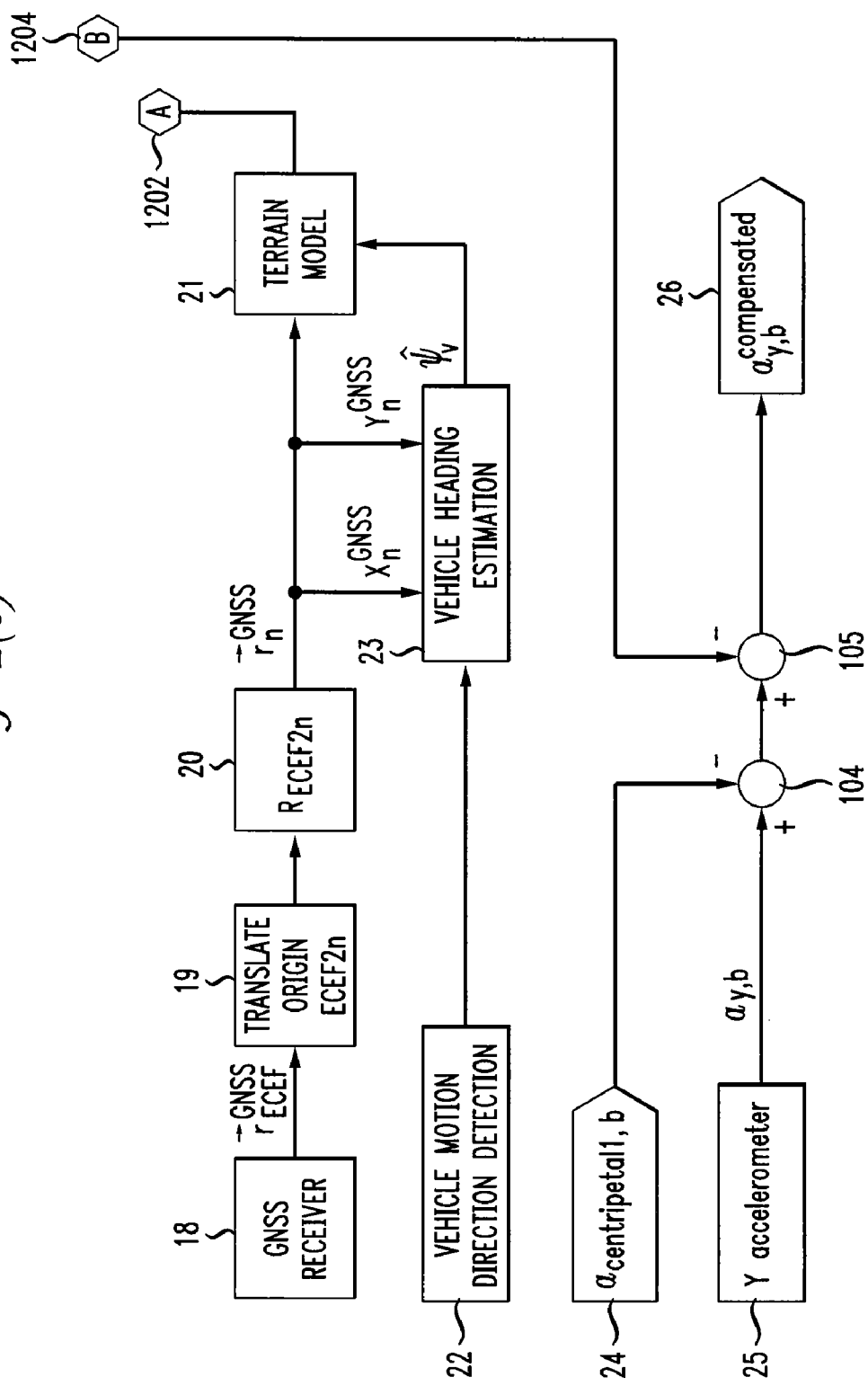
Figure 3A:
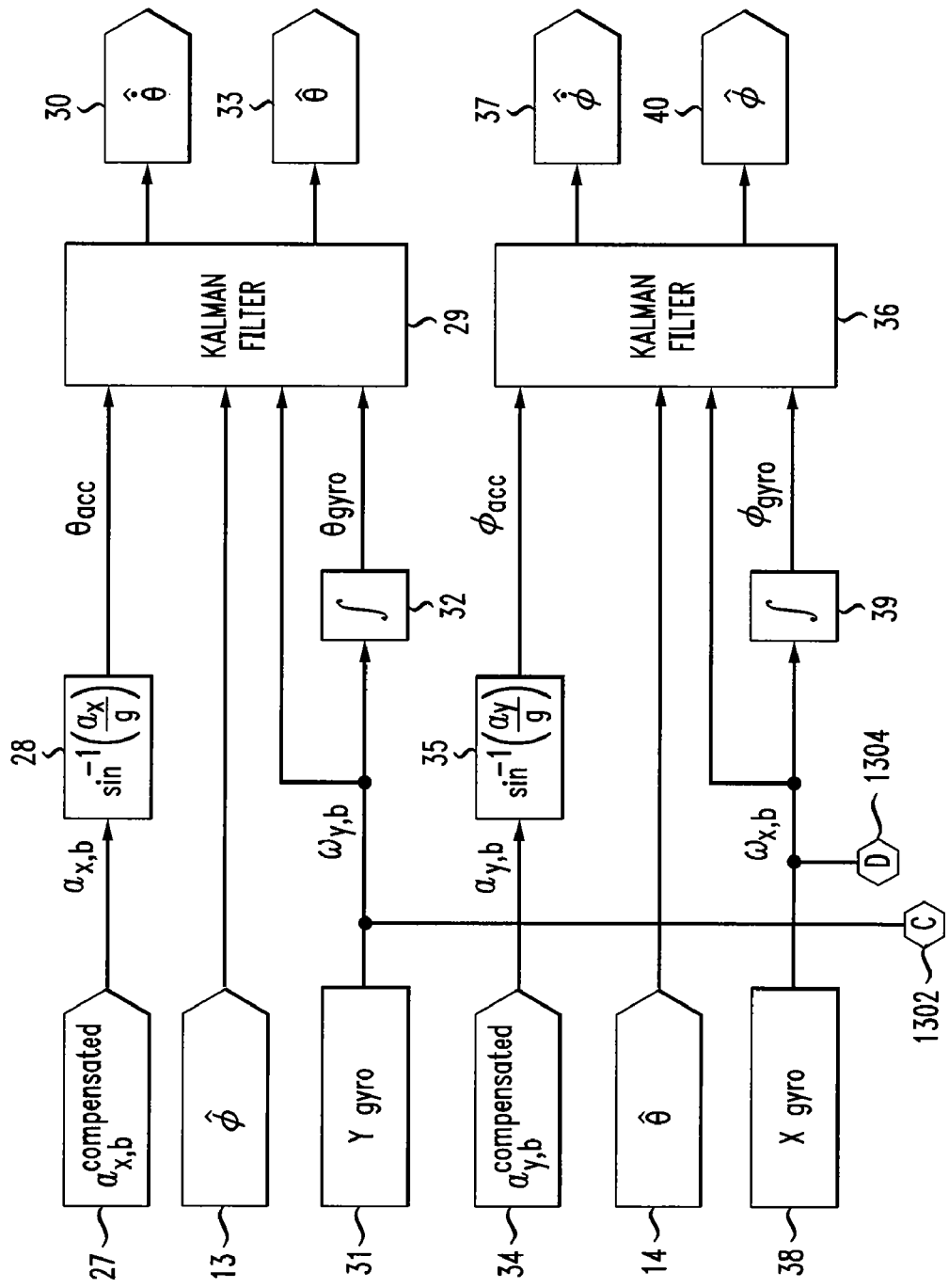
FIG. 3(a) and FIG. 3(b) show a schematic of blade roll and pitch angle estimation algorithms and a centripetal acceleration computation algorithm.
Figure 3B:
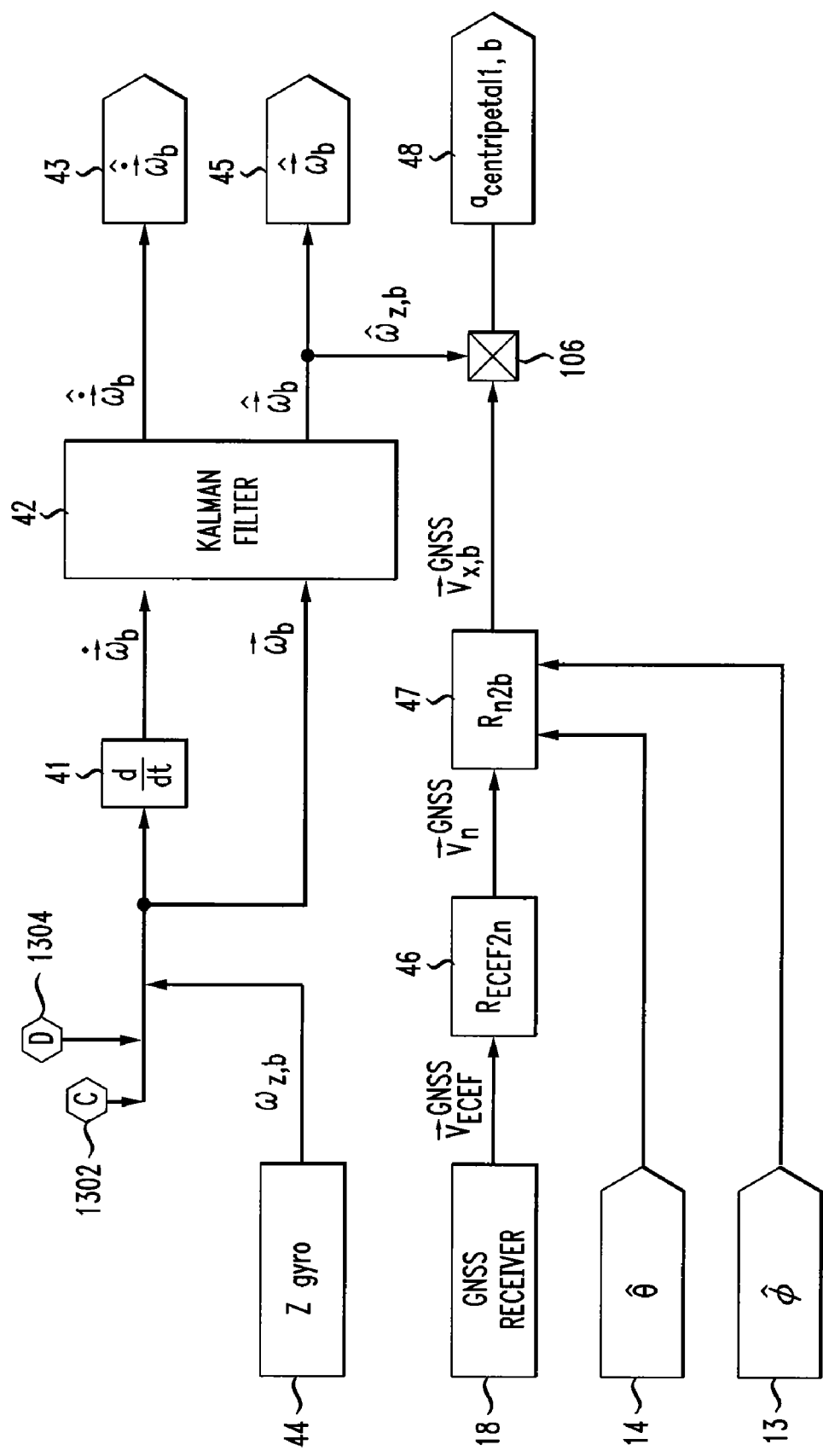

In order to locate the dozer on the terrain model 21, a GNSS position vector and a vehicle heading estimate are used. In FIG. 2(b), the GNSS position vector $\vec{r}_{ECEF}^{GNSS}$ in the ECEF frame is determined by GNSS receiver 18. This position vector is input to translation operator 19, which translates the origin from the ECEF frame to the navigation frame 1120. The translated position vector is then transformed by rotation matrix $R_{ECEF2n}$ 20 to the position vector $\vec{r}_n^{GNSS}$ resolved in the navigation frame 1120. The position vector $\vec{r}_n^{GNSS}$ is input into the terrain model 21.

The vehicle heading angle, defined as the angle from the Y (North) axis of the navigation frame 1120 [FIG. 1(*a*)], may be computed from the history of the GNSS position readings and Z-axis gyro measurements. The components $X_n^{GNSS}$, $Y_n^{GNSS}$ of $\vec{r}_n^{GNSS}$ are input into vehicle heading estimation operator 23. To ensure correct computation of the vehicle heading angle for either forward or backward dozer motion, a vehicle motion direction detection unit 22 is used. In an embodiment, this may be a simple encoder of a switch that is used to select forward or backward dozer speed by the dozer driver. The output of the encoder is also input into vehicle heading estimation operator 23. The value $\hat{\psi}_v$, an estimate of the vehicle heading angle resolved in the vehicle frame 1130 is output from vehicle heading estimation operator 23 into terrain model 21.

As discussed above, there are two correction factors for the Y-axis accelerometer, the tangential acceleration $a_{tangential}$ and the centripetal acceleration $a_{centripetal1}$ [FIG. 1(*d*)]. Referring to FIG. 2(*b*), $a_{y,b}$ the acceleration value measured by the Y accelerometer 25, is input into summation operator 104. The value $a_{centripetal,b}$ 24 is also input into summation operator 104, and subtracted from the value $a_{y,b}$. The difference $(a_{y,b}-a_{centripetal1,b})$ is input into summation operator 105. The value of $a_{tangential,b}$ is also input into summation operator 105, and subtracted from the previous difference $(a_{y,b}-a_{centripetal1,b})$. The output of summation operator 105 yields $a_{y,b}^{compensated}$ 26 ($a_{y,b}^{compensated}=a_{y,b}-a_{centripetal1,b}-a_{tangential,b}$). Details for calculating $a_{centripetal1,b}$ 24 and $a_{tangential,b}$ are discussed below.

The tangential acceleration $a_{tangential}$ [FIG. 1(*d*)], is computed in the vehicle frame as a product of the Z-axis angular velocity derivative estimate and the radius of rotation R, calculated from the dozer geometric parameters. The calculated value of $a_{tangential}$ is then converted to the blade frame and subtracted from the Y-axis accelerometer measurement. This sequence of steps is shown in FIG. 2(*a*) and FIG. 2(*b*). The input value $\hat{\dot{\vec{\omega}}}_b$ 15 is an estimate of the time derivative of the angular velocity vector measured in blade frame 1110. It is transformed by rotation matrix $R_{b2v}$ 16, and the $\hat{\dot{\omega}}_{z,v}$ component is calculated and input into multiplication operator 103. The radius R 8 is also input into multiplication operator 103. The output product $a_{tangential,v}$ is then transformed by rotation matrix $R_{v2b}$ 17 to the value $a_{tangential,b}$ in blade frame 1110. The value $a_{tangential,b}$ is then input to summation operator 105, as described above.

The value of $a_{centripetal1,b}$ is calculated as a product of the estimate of the angular velocity about the blade Z-axis (denoted $\hat{\omega}_{z,b}$) times the X-axis component of the dozer velocity, resolved in the blade frame 1110, (denoted $V_{x,b}^{GNSS}$) to obtain $a_{centripetal1,b}$. This operation is shown schematically in FIG. 3(*b*). The value of $\hat{\omega}_{z,b}$ and $V_{z,b}^{GNSS}$ are input into multiplication operator 106. The resulting output product is $a_{centripetal1,b}$ 48.

The velocity vector component $V_{x,b}^{GNSS}$ is calculated as follows. The GNSS receiver 18 calculates the velocity vector $\vec{V}_{ECEF}^{GNSS}$ referenced to the ECEF frame. This velocity vector is transformed by rotation matrix $R_{ECEF2n}$ 46 to velocity vector $\vec{V}_n^{GNSS}$ referenced to the navigation frame 1120. The velocity vector $\vec{V}_n^{GNSS}$ is then input into rotation matrix $R_{n2b}$ 47, and the velocity vector component $V_{x,b}^{GNSS}$ is input into multiplication operator 106, as discussed above. The rotation matrix $R_{n2b}$ 47 depends only on the blade pitch and the blade roll angle estimates, $\hat{\theta}$ 14 and $\hat{\phi}$ 13, which is appropriate for zero blade angle with respect to the dozer body.

The estimate of the angular velocity vector component $\hat{\omega}_{z,b}$ is calculated as follows. The angular velocity vector components $(\omega_{x,b},\omega_{y,b},\omega_{z,b})$ referenced to blade frame 1110 are measured by X gyro 38, Y gyro 31, and Z gyro 44, respectively [FIG. 3(*a*) and FIG. 3(*b*)]. The resulting angular velocity vector $\vec{\omega}_b$ is input into linear Kalman Filter 42. The angular velocity vector $\vec{\omega}_b$ is also input into time derivative operator 41, and the output $\dot{\vec{\omega}}_b$ is input into Kalman Filter 42. The outputs of Kalman Filter 42 are the estimates $\hat{\vec{\omega}}_b$ 45 and $\hat{\dot{\vec{\omega}}}_b$ 43. The component $\hat{\omega}_{z,b}$ is calculated from $\hat{\vec{\omega}}_b$ 45 and input into multiplication operator 106, as discussed above.

In an embodiment, a complementary filter approach is used to combine high frequency information from the rate gyros with low frequency information from the accelerometers to obtain noise-free and bias-free estimates of blade pitch and roll angles. Pitch and roll angle estimation filters are shown as linear Kalman Filter 29 and linear Kalman Filter 36, respectively, in FIG. 3(*a*).

The inputs to Kalman Filter 29 are the following:
The roll estimate $\hat{\phi}$ 13
The angular velocity vector component $\omega_{y,b}$ measured by Y gyro 31
The high-frequency component of the pitch angle, $\theta_{gyro}$, calculated as the time integral 32 of $\omega_{y,b}$
The low frequency component of the pitch angle, $\theta_{acc}$, calculated as $$\sin^{-1}\left(\frac{a_x}{g}\right)$$

with g=gravitational acceleration constant.
The outputs of Kalman Filter 29 are the estimates of the pitch angle $\hat{\theta}$ 33 and pitch angular velocity $\hat{\dot{\theta}}$ 30.
Similarly, the inputs to Kalman Filter 36 are the following:
The pitch estimate $\hat{\theta}$ 14
The angular velocity vector component $\omega_{x,b}$ measured by X gyro 38
The high-frequency component of the roll angle, $\phi_{gyro}$, calculated as the time integral 39 of $\omega_{x,b}$
The low frequency component of the roll angle, $\phi_{acc}$, calculated as $$\sin^{-1}\left(\frac{a_y}{g}\right)$$

The outputs of Kalman Filter 36 are estimates of the roll angle $\hat{\phi}$ 40 and roll angular velocity $\hat{\dot{\theta}}$ 37.

An embodiment of a blade elevation estimation algorithm is shown in FIG. 4(*a*) and FIG. 4(*b*). A complementary filter approach with loose coupling is used to integrate GNSS and IMU measurements and obtain noise-free and bias-free blade elevation and blade vertical velocity estimates. The rotation matrix $R_{b2n}$ 49, which transforms blade frame coordinates to navigation frame coordinates, is formed using pitch and roll angle estimates, output from pitch estimation filter 56 and roll estimation filter 57. The yaw angle is not included in the rotation matrix, because yaw angle is irrelevant for blade elevation control.

The components ($a_{x,b}$, $a_{y,b}$, $a_{z,b}$) of the acceleration vector $\vec{a}_b$, measured in the blade frame, are calculated from inputs $a_{x,b}^{compensated}$ 27, $a_{y,b}^{compensated}$ 34, and Z accelerometer 55, respectively. The acceleration vector $\vec{a}_b$ is converted from the blade frame to the navigation frame using rotation matrix $R_{b2n}$ 49. The resulting acceleration vector $\vec{a}_n$ is corrected [operation 50] to compensate for the presence of the acceleration of gravity in the measurement. The Z-component of acceleration, $a_{z,n}$, is then integrated once [integration operator 51] to obtain the inertial version of blade vertical velocity, $V_{z,n}^{IMU}$. It is integrated a second time [operation 52] to obtain the inertial version of blade elevation, $Z_n^{IMU}$.

In an embodiment, due to the use of inexpensive MEMS (micro-electromechanical systems) accelerometers, the values obtained as a result of integration contain biases that need to be estimated and subtracted. Raw values of the biases are obtained by subtracting values of blade elevation and vertical velocity obtained from the GNSS receiver from respective values obtained from the inertial system. Linear Kalman Filter 58 is used to estimate the values of the biases. The obtained estimates of the biases are subtracted from the inertial versions of blade elevation and vertical velocity to obtain estimates of blade elevation and vertical velocity, which are then used in a blade elevation controller (discussed below).

In practice, IMU 1105 [FIG. 1(*a*)] may not be installed exactly in the center of the blade roll rotation; therefore, blade rotations may result in changes in the IMU elevation. Blade roll rotations may also result in the changes of the GNSS antenna elevation. Blade rotations should not affect estimates of blade elevation and blade vertical velocity; therefore, corrections may need to be made in the blade elevation estimation algorithm to compensate for these effects. The rotation correction factors are denoted in FIG. 4(*a*) and FIG. 4(*b*) as $\Delta(Z_n^{GNSS})_{rot}$ 59 and $\Delta(V_{z,n}^{GNSS})_{rot}$ 60 for GNSS antenna elevation and vertical velocity, respectively, and $\Delta(Z_n^{IMU})_{rot}$ 54 and $\Delta(V_{z,n}^{IMU})_{rot}$ 53 for IMU elevation and vertical velocity, respectively. The correction factor $\Delta(Z_n^{GNSS})_{rot}$ 59 is subtracted from $Z_n^{GNSS}$ by summation operator 110. The correction factor $\Delta(V_{z,n}^{GNSS})_{rot}$ 60 is subtracted from $V_{z,n}^{GNSS}$ by summation operator 111. The correction factor $\Delta(Z_n^{IMU})_{rot}$ 54 is subtracted from $Z_n^{IMU}$ by summation operator 108. The correction factor $\Delta(V_{z,n}^{IMU})_{rot}$ 53 is subtracted from $V_{z,n}^{IMU}$ by summation operator 107. Values of these correction factors are calculated from geometric arguments and depend on the values of offsets of GNSS antenna and IMU in horizontal and vertical directions from the center of the blade roll rotation.

The GNSS position vector $\vec{r}_{ECEF}^{GNSS}$ in the ECEF frame is determined by GNSS receiver 18. This position vector is input to translation operator 19, which translates the origin from the ECEF frame to the navigation frame 1120. The position vector is then transformed by rotation matrix $R_{ECEF2n}$ 20 to the position vector $\vec{r}_n^{GNSS}$ resolved in the navigation frame 1120. The vector component $Z_n^{GNSS}$ is calculated and input into summation operator 110. As discussed above, the correction factor $\Delta(Z_n^{GNSS})_{rot}$ 59 is subtracted from $Z_n^{GNSS}$ by summation operator 110. The output of summation operator 110 is input into summation operator 109. The output of summation operator 108 is also input into summation operator 109. The resulting output value of summation operator 109 [$\delta Z_n = (Z_n^{IMU} - \Delta(Z_n^{IMU})_{rot}) - (Z_n^{GNSS} - \Delta(Z_n^{GNSS})_{rot})$] is input into Kalman Filter 58.

The GNSS velocity vector $\vec{V}_{ECEF}^{GNSS}$ is also determined by GNSS receiver 18. This velocity vector is then transformed by the rotation matrix $R_{ECEF2n}$ 46 to the velocity vector $\vec{V}_n^{GNSS}$, resolved in the navigation frame 1120. The velocity vector component $V_{z,n}^{GNSS}$ is calculated and input into summation operator 111. As discussed above, the correction factor $\Delta(V_{z,n}^{GNSS})_{rot}$ 60 is subtracted from $V_{z,n}^{GNSS}$ by summation operator 111. The resulting difference is input into summation operator 112. The output of summation operator 107 is also input into summation operator 112. The resulting value [$\delta V_{z,n} = (V_{z,n}^{IMU} - \Delta(V_{z,n}^{IMU})_{rot}) - (V_{z,n}^{GNSS} - \Delta(V_{z,n}^{GNSS})_{rot})$] is input into Kalman Filter 58.

The outputs of Kalman Filter 58 are $\delta \hat{Z}_n$ and $\delta \hat{V}_{z,n}$. The value $\delta \hat{Z}_n$ is input into summation operator 114. The output of summation operator 108 is also input into summation operator 114. The resulting output of summation operator 114 value is $\hat{Z}_n = Z_n^{IMU} - \Delta(Z_n^{IMU})_{rot} - \delta \hat{Z}_n$. Similarly, the value $\delta \hat{V}_{z,n}$ is input into summation operator 113. The output of summation operator 107 is also input into summation operator 113. The resulting output of summation operator 113 is $\hat{V}_{z,n} = V_{z,n}^{IMU} - \Delta(V_{z,n}^{IMU})_{rot} - \delta \hat{V}_{z,n}$.

Figure 5A:
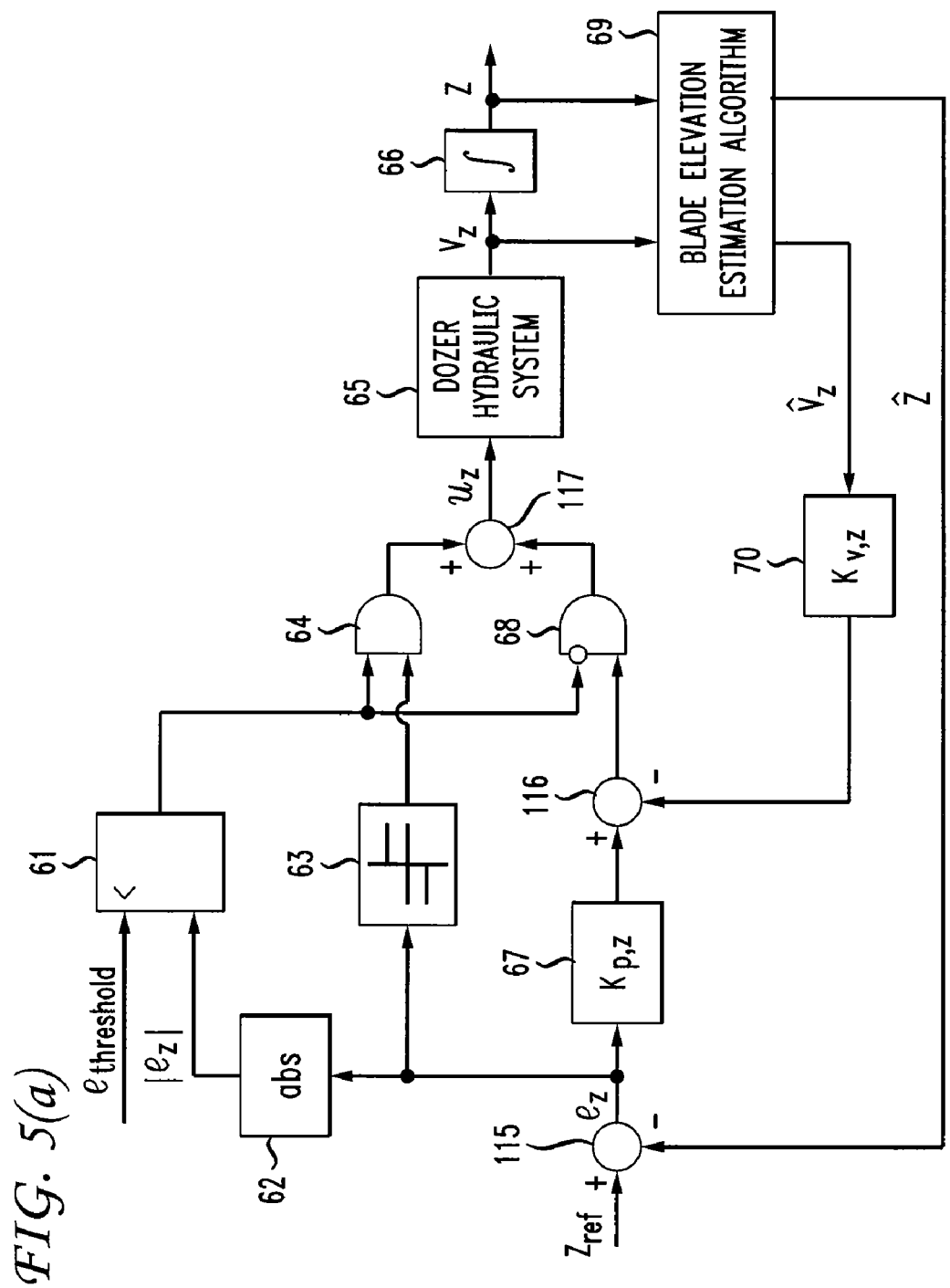
FIG. 5(a) shows a schematic of a blade elevation control algorithm.
Figure 5B:
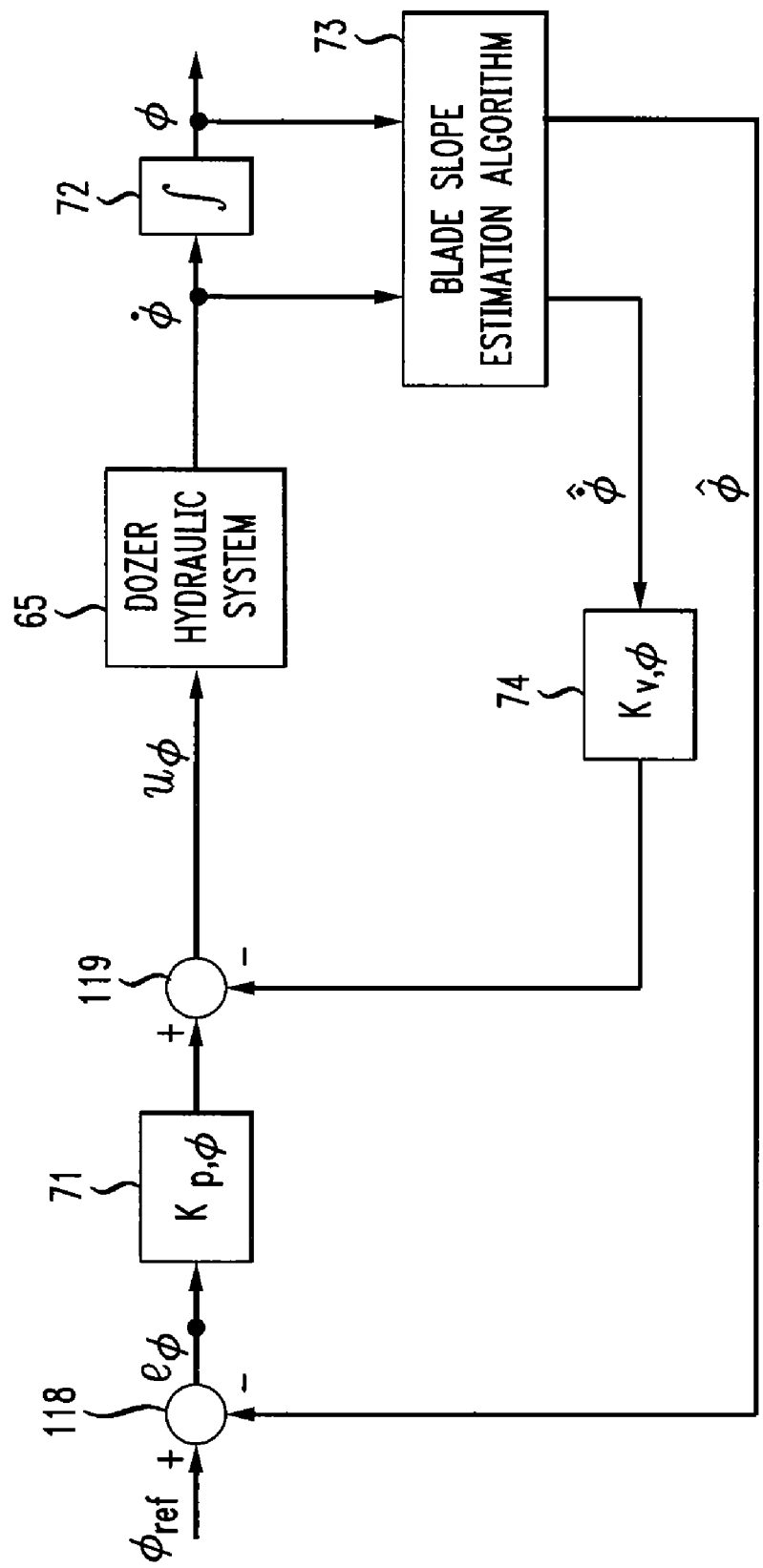
FIG. 5(b) shows a schematic of a blade slope control algorithm.

An embodiment of a blade elevation controller and an embodiment of a blade slope controller are shown in FIG. 5(*a*) and Fig. (*b*), respectively. In the figures, the following notation is used:

e refers to errors [an error is the difference between the reference (or commanded) value and the estimated value of a parameter]. The value $e_z$ refers to the error in blade elevation. The value $e_\phi$ refers to the error in blade slope.

K refers to control gains. The values $K_{p,z}$ and $K_{p,\phi}$ refer to proportional control gains for blade elevation and blade slope, respectively. The values $K_{v,z}$ and $K_{v,\phi}$ refer to velocity control gains for blade elevation and blade slope, respectively.

u refers to control signals. The values $u_z$ and $u_\phi$ refer to the control signal for blade elevation and blade slope, respectively.

In FIG. 5(*a*), $z_{ref}$ is the reference (desired) value of the blade elevation. The measured blade elevation Z and blade vertical velocity $V_z$ are input into blade elevation estimation algorithm 69. The outputs of blade estimation algorithm 69 are the estimates $\hat{Z}$ and $\hat{V}_z$. The value of $\hat{Z}$ is subtracted from $Z_{ref}$ (via summation operator 115) to yield the error signal $e_z$, which is multiplied by proportional control gain $K_{p,z}$ 67. The value $\hat{V}_z$ is multiplied by velocity control gain $K_{v,z}$ 70. The value of $K_{v,z} \hat{V}_z$ is subtracted from the value of $K_{p,z} e_z$ by the summation operator 116. The output of summation operator 116 is input into AND operator 68.

The error $e_z$ is input into relay element 63, whose output is input to AND operator 64. In an embodiment, two mutually-exclusive control modes (discussed below) may be used, depending on the value of $e_z$. The error $e_z$ is also input to absolute value operator 62, whose output value $|e_z|$ is compared to an error threshold $e_{threshold}$ (via comparison operator 61). The output of comparison operator 61 is input to AND operator 64, and its complement is input into AND operator 68. The outputs of AND operator 64 and AND operator 68 are added by summation operator 117, whose output, the control signal $u_z$, is input into dozer hydraulic system 65, which controls blade elevation.

If the absolute value of the error $|e_z|$ is greater than a specified error threshold $e_{threshold}$, a relay-type control 63 is enabled. In this mode, the control signal switches between maximal values depending on the sign of the error. This mode is included in the controller to allow for fast high amplitude disturbance rejection. When the absolute value of the error is smaller than the threshold, proportional-derivative (PD) control mode is enabled, and the relay mode is disabled. Use of PD control, rather than proportional control, takes advantage of the stabilizing effect of velocity feedback. The dozer hydraulic system 65 has a time delay associated with it, which, when a proportional controller is used, may result in blade instability and cause specific wave-like patterns on the ground after grading. Inclusion of velocity feedback in the controller helps to resolve this problem. The accuracy of the velocity measured by GNSS alone may not be adequate. In an embodiment, combined measurements from GNSS and IMU provide a more accurate velocity estimate.

For the blade slope controller, PD control is used. Measurements of both slope angle and slope angular velocity are provided by an IMU [such as IMU 1105 in FIG. 1(*a*)]. In FIG. 5(*b*), $\phi_{ref}$ is the reference (desired) value of the blade slope angle. The measured blade slope angle $\phi$ and blade slope angular velocity $\dot{\phi}$ are input into the blade slope estimation algorithm 73. The outputs of blade slope estimation algorithm 73 are the estimates $\hat{\phi}$ and $\hat{\dot{\phi}}$. The value $\hat{\phi}$ is subtracted from the value $\phi_{ref}$ by summation operator 118 to yield the error $e_\phi$, which is multiplied by the proportional control gain $K_{p,\phi}$ 71. The value $\hat{\dot{\phi}}$ is multiplied by the velocity control gain $K_{v,\phi}$ 74. The value $K_{v,\phi}\hat{\dot{\phi}}$ is subtracted from the value $K_{p,\phi}e_\phi$ by summation operator 119 to yield control signal $u_\phi$, which is input to dozer hydraulic system 65.

Figure 6:
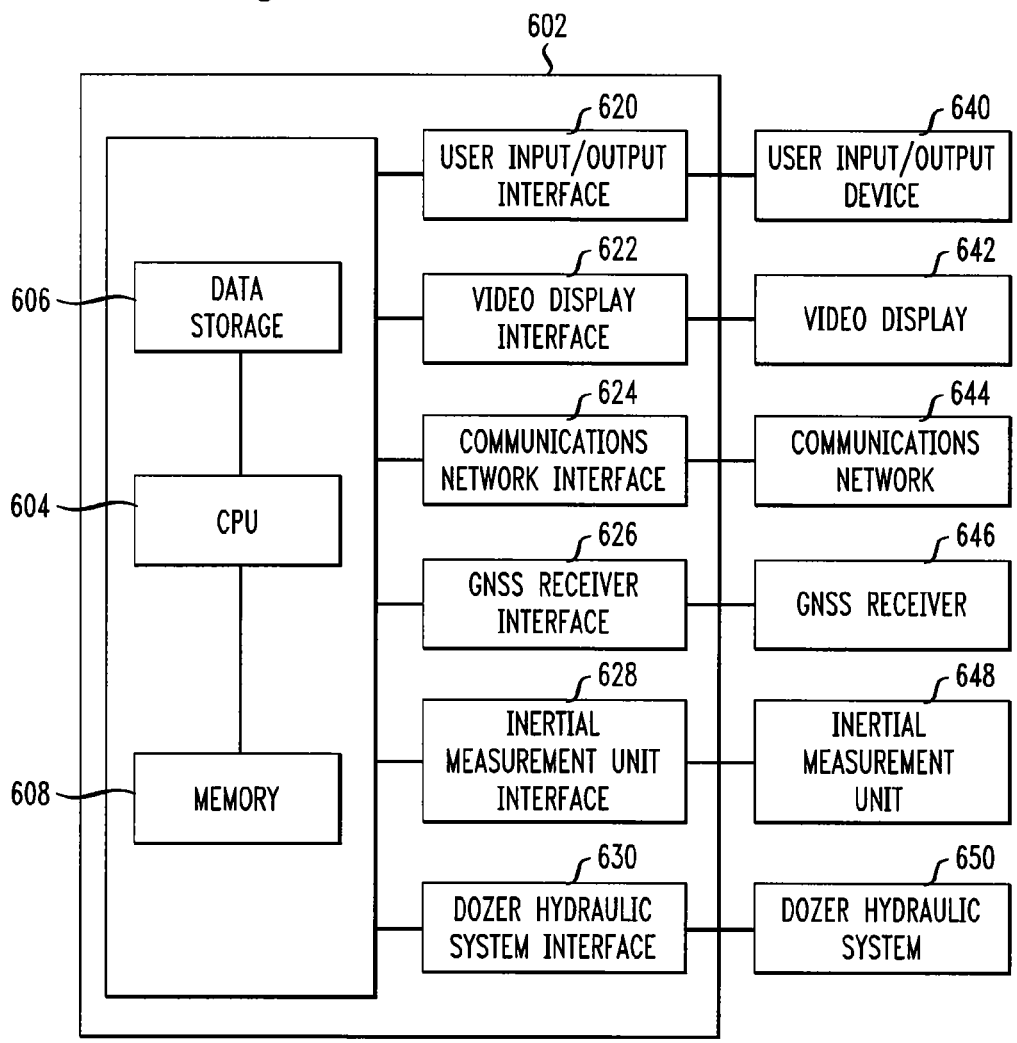
FIG. 6 shows a schematic of a computer which may be used to receive measurements, process measurements, and execute control algorithms.

One embodiment of a control box which controls a dozer blade may be implemented using a computer. As shown in FIG. 6, computer 602 may be any type of well-known computer comprising a central processing unit (CPU) 604, memory 608, data storage 606, and user input/output interface 620. Data storage 606 may comprise a hard drive, non-volatile memory, or other computer readable media. User input/output interface 620 may comprise a connection to a user input device 640, such as a keyboard or mouse. Computer 602 may further comprise video display interface 622, which may transform signals from CPU 604 to signals which drive video display 642. As is well known, a computer operates under control of computer software which defines the overall operation of the computer and applications. CPU 604 controls the overall operation of the computer and applications by executing computer program instructions which define the overall operation and applications. The computer program instructions may be stored in data storage 606 and loaded into memory 608 when execution of the program instructions is desired. For example, computer instructions for calculating the blade elevation estimation algorithm 69 in FIG. 5(*a*) and the blade slope estimation algorithm 73 in FIG. 5(*b*) may be stored in data storage 606. Computers are well known in the art and will not be described in detail herein.

Computer 602 may further comprise one or more network interfaces. For example, communications network interface 624 may comprise a connection to communications network 644, which may be a packet data network. Computer program instructions, for example, may be downloaded to computer 602 via communications network 644. Computer 602 may further comprise a GNSS receiver interface 626, which receives GNSS measurements (such as blade elevation and blade vertical velocity) from GNSS receiver 646, which receives signals from GNSS antenna 1103 [FIG. 1(*a*)]. Computer 602 may further comprise inertial measurement unit interface 628, which receives inertial measurements (such as blade acceleration and angular velocity) from inertial measurement unit 648 [such as IMU 1105 in FIG. 1(*a*)]. Computer 602 may further comprise dozer hydraulic system interface 630, which sends control signals to dozer hydraulic system 650. An example of dozer hydraulic system 650 is dozer hydraulic system 65 [FIG. 5(*a*) and FIG. 5(*b*)], which controls the elevation and slope angle of dozer blade 1102 [FIG. 1(*a*)]. Examples of control signals are $u_z$ [FIG. 5(*a*)] and $u_\phi$ [FIG. 5(*b*)].

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for controlling a dozer blade mounted on a dozer body, the method comprising the steps of:
   receiving first measurements from at least one global navigation satellite system sensor mounted on the dozer blade, the first measurements comprising measurements of an elevation of the dozer blade and a vertical velocity of the dozer blade;
   receiving second measurements from a plurality of inertial sensors mounted on the dozer blade, the second measurements comprising at least one of:
      a first acceleration measurement of the dozer blade along a first orthogonal axis;
      a second acceleration measurement of the dozer blade along a second orthogonal axis;
      a third acceleration measurement of the dozer blade along a third orthogonal axis;
      a first angular velocity measurement of the dozer blade about the first orthogonal axis;
      a second angular velocity measurement of the dozer blade about the second orthogonal axis; and
      a third angular velocity measurement of the dozer blade about the third orthogonal axis;
   calculating, based at least in part on the first measurements and the second measurements, compensation of a tangential acceleration and compensation of at least one centripetal acceleration arising from at least one circular motion of the dozer body; and
   controlling the elevation of the dozer blade and a slope angle of the dozer blade based at least in part on the first measurements, and the second measurements, the compensation of the tangential acceleration, and the compensation of the at least one centripetal acceleration.

2. The method of claim 1, further comprising the steps of:
   calculating an estimate of the elevation of the dozer blade based at least in part on the first measurements, the second measurements, the compensation of the tangential acceleration, and the compensation of the at least one centripetal acceleration;
   calculating an estimate of the vertical velocity of the dozer blade based at least in part on the first measurements, the second measurements, the compensation of the tangential acceleration, and the compensation of the at least one centripetal acceleration; and
   calculating an estimate of the slope angle of the dozer blade based at least in part on the second measurements, the compensation of the tangential acceleration, and the compensation of the at least one centripetal acceleration.

3. The method of claim 1, further comprising the step of:
   calculating an estimate of a pitch angle of the dozer blade and an estimate of the slope angle of the dozer blade based at least in part on the second measurements, the compensation of the tangential acceleration, and the compensation of the at least one centripetal acceleration.

4. The method of claim 1, further comprising the steps of:
calculating an estimate of the elevation of the dozer blade based at least in part on the first measurements, the second measurements, the compensation of the tangential acceleration, and the compensation of the at least one centripetal acceleration;
calculating an estimate of the vertical velocity of the dozer blade based at least in part on the first measurements, the second measurements, the compensation of the tangential acceleration, and the compensation of the at least one centripetal acceleration;
calculating an estimate of the slope angle of the dozer blade based at least in part on the second measurements, the compensation of the tangential acceleration, and the compensation of the at least one centripetal acceleration;
calculating an estimate of a pitch angle of the dozer blade based at least in part on the second measurements, the compensation of the tangential acceleration, and the compensation of the at least one centripetal acceleration;
calculating an estimate of a slope angular velocity of the dozer blade based at least in part on the second measurements, the compensation of the tangential acceleration, and the compensation of the at least one centripetal acceleration; and
controlling the elevation of the dozer blade and the slope angle of the dozer blade based at least in part on the estimate of the elevation of the dozer blade, the estimate of the vertical velocity of the dozer blade, the estimate of the slope angle of the dozer blade, and the estimate of the slope angular velocity of the dozer blade.

5. The method of claim 1, wherein the plurality of inertial sensors comprises:
three orthogonally placed accelerometers configured to measure acceleration along the first orthogonal axis, the second orthogonal axis, and the third orthogonal axis; and
three orthogonally placed rate gyros configured to measure angular velocity about the first orthogonal axis, the second orthogonal axis, and the third orthogonal axis.

6. An apparatus for controlling a dozer blade mounted on a dozer body, the apparatus comprising:
means for receiving first measurements from at least one global navigation satellite system (GNSS) sensor mounted on the dozer blade, the first measurements comprising measurements of an elevation of the dozer blade and a vertical velocity of the dozer blade;
means for receiving second measurements from a plurality of inertial sensors mounted on the dozer blade, the second measurements comprising at least one of:
a first acceleration measurement of the dozer blade along a first orthogonal axis;
a second acceleration measurement of the dozer blade along a second orthogonal axis;
a third acceleration measurement of the dozer blade along a third orthogonal axis;
a first angular velocity measurement of the dozer blade about the first orthogonal axis;
a second angular velocity measurement of the dozer blade about the second orthogonal axis; and
a third angular velocity measurement of the dozer blade about the third orthogonal axis;
means for calculating, based at least in part on the first measurements and the second measurements, compensation of a tangential acceleration and compensation of at least one centripetal acceleration arising from at least one circular motion of the dozer body; and
means for controlling the elevation of the dozer blade and a slope angle of the dozer blade based at least in part on the first measurements, the second measurements, the compensation of the tangential acceleration, and the compensation of the at least one centripetal acceleration.

7. The apparatus of claim 6, further comprising:
means for calculating an estimate of the elevation of the dozer blade based at least in part on the first measurements, and the second measurements, the compensation of the tangential acceleration, the compensation of the at least one centripetal acceleration;
means for calculating an estimate of the vertical velocity of the dozer blade based at least in part on the first measurements, and the second measurements, the compensation of the tangential acceleration, and the compensation of the at least one centripetal acceleration; and
means for calculating an estimate of the slope angle of the dozer blade based at least in part on the second measurements, the compensation of the tangential acceleration, and the compensation of the at least one centripetal acceleration.

8. The apparatus of claim 6, further comprising:
means for calculating an estimate of a pitch angle of the dozer blade and an estimate of the slope angle of the dozer blade based at least in part on the second measurements, the compensation of the tangential acceleration, and the compensation of the at least one centripetal acceleration.

9. The apparatus of claim 6, further comprising:
means for calculating an estimate of the elevation of the dozer blade based at least in part on the first measurements, the second measurements, the compensation of the tangential acceleration, and the compensation of the at least one centripetal acceleration;
means for calculating an estimate of the vertical velocity of the dozer blade based at least in part on the first measurements, the second measurements, the compensation of the tangential acceleration, and the compensation of the at least one centripetal acceleration;
means for calculating an estimate of the slope angle of the dozer blade based at least in part on the second measurements, the compensation of the tangential acceleration, and the compensation of the at least one centripetal acceleration;
means for calculating an estimate of a pitch angle of the dozer blade based at least in part on the second measurements, the compensation of the tangential acceleration, and the compensation of the at least one centripetal acceleration;
means for calculating an estimate of a slope angular velocity of the dozer blade based at least in part on the second measurements, the compensation of the tangential acceleration, and the compensation of the at least one centripetal acceleration; and
means for controlling the elevation of the dozer blade and the slope angle of the dozer blade based at least in part on the estimate of the elevation of the dozer blade, the estimate of the vertical velocity of the dozer blade, the estimate of the slope angle of the dozer blade, and the estimate of the slope angular velocity of the dozer blade.

10. The apparatus of claim 6, wherein the at least one GNSS sensor comprises:
at least one antenna configured to receive GNSS signals.

11. The apparatus of claim 6, wherein the plurality of inertial sensors comprises:
three orthogonally placed accelerometers configured to measure acceleration along the first orthogonal axis, the second orthogonal axis, and the third orthogonal axis; and
three orthogonally placed rate gyros configured to measure angular velocity about the first orthogonal axis, the second orthogonal axis, and the third orthogonal.

12. A computer readable medium storing computer instructions for controlling a dozer blade mounted on a dozer body, the computer instructions defining the steps of:
receiving first measurements from at least one global navigation satellite system sensor mounted on the dozer blade, the first measurements comprising measurements of an elevation of the dozer blade and a vertical velocity of the dozer blade;
receiving second measurements from a plurality of inertial sensors mounted on the dozer blade, the second measurements comprising at least one of:
a first acceleration measurement of the dozer blade along a first orthogonal axis;
a second acceleration measurement of the dozer blade along a second orthogonal axis;
a third acceleration measurement along a third orthogonal axis;
a first angular velocity measurement of the dozer blade about the first orthogonal axis;
a second angular velocity measurement about the second orthogonal axis; and
a third angular velocity measurement of the dozer blade about the third orthogonal axis;
calculating, based at least in part on the first measurements and the second measurements, compensation of a tangential acceleration and compensation of at least one centripetal acceleration arising from at least one circular motion of the dozer body; and
controlling the elevation of the dozer blade and a slope angle of the dozer blade based at least in part on the first measurements, the second measurements, the compensation of the tangential acceleration, and the compensation of the at least one centripetal acceleration.

13. The computer readable medium of claim 12, wherein the computer instructions further comprise computer instructions defining the steps of:
calculating an estimate of the elevation of the dozer blade based at least in part on the first measurements, the second measurements, the compensation of the tangential acceleration, and the compensation of the at least one centripetal acceleration;
calculating an estimate of the vertical velocity of the dozer blade based at least in part on the first measurements, the second measurements, the compensation of the tangential acceleration, and the compensation of the at least one centripetal acceleration; and
calculating an estimate of the slope angle of the dozer blade based at least in part on the second measurements, the compensation of the tangential acceleration, and the compensation of the at least one centripetal acceleration.

14. The computer readable medium of claim 12, wherein the computer instructions further comprise computer instructions defining the step of:
calculating an estimate of a pitch angle of the dozer blade and an estimate of the slope angle of the dozer blade based at least in part on the second measurements, the compensation of the tangential acceleration, and the compensation of the at least one centripetal acceleration.

15. The computer readable medium of claim 12, wherein the computer instructions further comprise computer instructions defining the steps of:
calculating an estimate of the elevation of the dozer blade based at least in part on the first measurements, the second measurements, the compensation of the tangential acceleration, and the compensation of the at least one centripetal acceleration;
calculating an estimate of the vertical velocity of the dozer blade based at least in part on the first measurements, the second measurements, the compensation of the tangential acceleration, and the compensation of the at least one centripetal acceleration;
calculating an estimate of the slope angle of the dozer blade based at least in part on the second measurements, the compensation of the tangential acceleration, and the compensation of the at least one centripetal acceleration;
calculating an estimate of a pitch angle of the dozer blade based at least in part on the second measurements, the compensation of the tangential acceleration, and the compensation of the at least one centripetal acceleration;
calculating an estimate of a slope angular velocity of the dozer blade based at least in part on the second measurements, the compensation of the tangential acceleration, and the compensation of the at least one centripetal acceleration; and
controlling the elevation of the dozer blade and the slope angle of the dozer blade based at least in part on the estimate of the elevation of the dozer blade, the estimate of the vertical velocity of the dozer blade, the estimate of the slope angle of the dozer blade, and the estimate of the slope angular velocity of the dozer blade.

16. The computer readable medium of claim 12, wherein the plurality of inertial sensors comprises:
three orthogonally placed accelerometers configured to measure acceleration along the first orthogonal axis, the second orthogonal axis, and the third orthogonal axis; and
three orthogonally placed rate gyros configured to measure angular velocity about the first orthogonal axis, the second orthogonal axis, and the third orthogonal axis.

* * * * *

UNITED STATES PATENT AND TRADEMARK OFFICE
CERTIFICATE OF CORRECTION

PATENT NO. : 8,145,391 B2  Page 1 of 2
APPLICATION NO. : 12/207038
DATED : March 27, 2012
INVENTOR(S) : Alexander Omelchenko et al.

It is certified that error appears in the above-identified patent and that said Letters Patent is hereby corrected as shown below:

On the Title Page, after Item (65), "Prior Publication Data US 2009/0069987 A1   March 12, 2009", insert the following -- Related U.S. Application Data (60) Provisional application No. 60/993,713, filed on September 12, 2007. --

In the Specification

In column 4, line 37, "the input value $\bar{\tilde{\omega}}_b$" should read -- the input value $\hat{\tilde{\omega}}_b$ --

In column 5, line 22, "The value $a_{centripetal,b}$" should read -- The value $a_{centripetal1,b}$ --

In column 5, line 54, "The value of $\hat{\omega}_{x,b}$ and $V_{z,b}^{GNSS}$ are input" should read -- The value of $\hat{\omega}_{x,b}$ and $V_{x,b}^{GNSS}$ are input --

In column 6, line 56, "and roll angular velocity $\dot{\theta}$37" should read -- and roll angular velocity $\dot{\phi}$37 --

In the Claims

In column 10, line 47, "and the second measurements" should read -- the second measurements --

In column 12, line 11, ",and the second measurements" should read -- ,the second measurements --

In column 12, line 12, "acceleration, the compensation", should read -- acceleration, and the Signed and Sealed this
Twenty-fifth Day of November, 2014

Michelle K. Lee
*Deputy Director of the United States Patent and Trademark Office* compensation --

In column 13, line 9, ",and the third orthogonal" should read -- and the third orthogonal axis --